United States Patent
Crabtree et al.

(10) Patent No.: US 12,500,929 B2
(45) Date of Patent: *Dec. 16, 2025

(54) HOST-LEVEL TICKET FORGERY DETECTION AND EXTENSION TO NETWORK ENDPOINTS

(71) Applicant: QOMPLX LLC, Reston, VA (US)

(72) Inventors: Jason Crabtree, Vienna, VA (US); Richard Kelley, Woodbridge, VA (US)

(73) Assignee: QOMPLX LLC, Reston, VA (US)

( * ) Notice: Subject to any disclaimer, the term of this patent is extended or adjusted under 35 U.S.C. 154(b) by 222 days.

This patent is subject to a terminal disclaimer.

(21) Appl. No.: 18/361,811

(22) Filed: Jul. 28, 2023

(65) Prior Publication Data

US 2025/0039233 A1    Jan. 30, 2025

(51) Int. Cl.
*H04L 29/06* (2006.01)
*H04L 9/40* (2022.01)
*G06F 11/00* (2006.01)
*H04L 9/32* (2006.01)

(52) U.S. Cl.
CPC ................. *H04L 63/1483* (2013.01)

(58) Field of Classification Search
CPC .............. H04L 63/1483; H04L 63/1425
See application file for complete search history.

(56) References Cited

U.S. PATENT DOCUMENTS

| | | |
|---|---|---|
| 5,669,000 A | 9/1997 | Jessen et al. |
| 6,256,544 B1 | 7/2001 | Weissinger |
| 6,477,572 B1 | 11/2002 | Elderton et al. |
| 7,072,863 B1 | 7/2006 | Phillips et al. |
| 7,657,406 B2 | 2/2010 | Tolone et al. |

(Continued)

FOREIGN PATENT DOCUMENTS

| | | | |
|---|---|---|---|
| EP | 3258375 A1 * | 12/2017 | ............. H04L 63/08 |
| WO | 2014159150 A1 | 10/2014 | |
| WO | 2017075543 A1 | 5/2017 | |

OTHER PUBLICATIONS

Hua Wang, Yanchun Zhang, Jinli Cao, Vijay Varadharajan; "Achieving Secure and Flexible M-Services Through Tickets"; IEEE Transactions on Systems, Man, and Cybernetics—Part A: Systems and Humans; vol. 33, No. 6, Nov. 2003; Journal Article; Publisher: IEEE; pp. 697-708 (Year: 2003).*

*Primary Examiner* — Fatoumata Traore
*Assistant Examiner* — Courtney D Fields
(74) *Attorney, Agent, or Firm* — Galvin Patent Law LLC; Brian R. Galvin

(57) ABSTRACT

A system and method for detection and prevention of ticket forgery cyberattacks by improving host-level analytics and monitoring and extending the improved host-level analytics and monitoring to endpoints of a network. The methodology described herein comprises the use of a ticket-granting log extension utility which stores every logon session on a network, queries the local ticket cache, and generates additional custom data as a part of an event log stream such as a start time, end time, renew time, and related session data. This comprehensive log extension data can be used to identify certain types of ticket forgery cyberattacks by comparing the user session name with the client name identified in the ticket presented for access to network resources and other means. This host-level ticket forgery detection can be extended to network endpoints for additional security.

20 Claims, 9 Drawing Sheets

(56) References Cited

U.S. PATENT DOCUMENTS

| | | |
|---|---|---|
| 7,698,213 B2 | 4/2010 | Lancaster |
| 7,739,653 B2 | 6/2010 | Venolia |
| 8,065,257 B2 | 11/2011 | Kuecuekyan |
| 8,145,761 B2 | 3/2012 | Liu et al. |
| 8,281,121 B2 | 10/2012 | Nath et al. |
| 8,615,800 B2 | 12/2013 | Baddour et al. |
| 8,788,306 B2 | 7/2014 | Delurgio et al. |
| 8,793,758 B2 | 7/2014 | Raleigh et al. |
| 8,914,878 B2 | 12/2014 | Burns et al. |
| 8,997,233 B2 | 3/2015 | Green et al. |
| 9,134,966 B2 | 9/2015 | Brock et al. |
| 9,141,360 B1 | 9/2015 | Chen et al. |
| 9,231,962 B1 | 1/2016 | Yen et al. |
| 9,294,497 B1 | 3/2016 | Ben-Or et al. |
| 9,306,965 B1 | 4/2016 | Grossman et al. |
| 9,602,530 B2 | 3/2017 | Ellis et al. |
| 9,654,495 B2 | 5/2017 | Hubbard et al. |
| 9,672,355 B2 | 6/2017 | Titonis et al. |
| 9,686,308 B1 | 6/2017 | Srivastava |
| 9,762,443 B2 | 9/2017 | Dickey |
| 9,887,933 B2 | 2/2018 | Lawrence, III |
| 9,946,517 B2 | 4/2018 | Talby et al. |
| 10,061,635 B2 | 8/2018 | Ellwein |
| 10,102,480 B2 | 10/2018 | Dirac et al. |
| 10,210,246 B2 | 2/2019 | Stojanovic et al. |
| 10,210,255 B2 | 2/2019 | Crabtree et al. |
| 10,216,485 B2 | 2/2019 | Misra et al. |
| 10,242,406 B2 | 3/2019 | Kumar et al. |
| 10,248,910 B2 | 4/2019 | Crabtree et al. |
| 10,318,882 B2 | 6/2019 | Brueckner et al. |
| 10,367,829 B2 | 7/2019 | Huang et al. |
| 10,511,498 B1 | 12/2019 | Narayan et al. |
| 2003/0041254 A1 | 2/2003 | Challener et al. |
| 2003/0145225 A1 | 7/2003 | Bruton et al. |
| 2004/0098610 A1 | 5/2004 | Hrastar |
| 2005/0289072 A1 | 12/2005 | Sabharwal |
| 2006/0149575 A1 | 7/2006 | Varadarajan et al. |
| 2007/0150744 A1 | 6/2007 | Cheng et al. |
| 2009/0012760 A1 | 1/2009 | Schunemann |
| 2009/0064088 A1 | 3/2009 | Barcia et al. |
| 2009/0089227 A1 | 4/2009 | Sturrock et al. |
| 2009/0182672 A1 | 7/2009 | Doyle |
| 2009/0222562 A1 | 9/2009 | Liu et al. |
| 2009/0293128 A1 | 11/2009 | Lippmann et al. |
| 2011/0060821 A1 | 3/2011 | Loizeaux et al. |
| 2011/0087888 A1 | 4/2011 | Rennie |
| 2011/0154341 A1 | 6/2011 | Pueyo et al. |
| 2012/0266244 A1 | 10/2012 | Green et al. |
| 2013/0073062 A1 | 3/2013 | Smith et al. |
| 2013/0132149 A1 | 5/2013 | Wei et al. |
| 2013/0191416 A1 | 7/2013 | Lee et al. |
| 2013/0246996 A1 | 9/2013 | Duggal et al. |
| 2013/0304623 A1 | 11/2013 | Kumar et al. |
| 2014/0074826 A1 | 3/2014 | Cooper et al. |
| 2014/0156806 A1 | 6/2014 | Karpistsenko et al. |
| 2014/0244612 A1 | 8/2014 | Bhasin et al. |
| 2014/0245443 A1 | 8/2014 | Chakraborty |
| 2014/0279762 A1 | 9/2014 | Xaypanya et al. |
| 2015/0095303 A1 | 4/2015 | Sonmez et al. |
| 2015/0149979 A1 | 5/2015 | Talby et al. |
| 2015/0163242 A1 | 6/2015 | Laidlaw et al. |
| 2015/0169294 A1 | 6/2015 | Brock et al. |
| 2015/0195192 A1 | 7/2015 | Vasseur et al. |
| 2015/0236935 A1 | 8/2015 | Bassett |
| 2015/0281225 A1 | 10/2015 | Schoen et al. |
| 2015/0317481 A1 | 11/2015 | Gardner et al. |
| 2015/0339263 A1 | 11/2015 | Ata et al. |
| 2015/0347414 A1 | 12/2015 | Xiao et al. |
| 2015/0379424 A1 | 12/2015 | Dirac et al. |
| 2016/0004858 A1 | 1/2016 | Chen et al. |
| 2016/0028758 A1 | 1/2016 | Ellis et al. |
| 2016/0072845 A1 | 3/2016 | Chiviendacz et al. |
| 2016/0078361 A1 | 3/2016 | Brueckner et al. |
| 2016/0099960 A1 | 4/2016 | Gerritz et al. |
| 2016/0105454 A1 | 4/2016 | Li et al. |
| 2016/0140519 A1 | 5/2016 | Trepca et al. |
| 2016/0212171 A1 | 7/2016 | Senanayake et al. |
| 2016/0275123 A1 | 9/2016 | Lin et al. |
| 2016/0285732 A1 | 9/2016 | Brech et al. |
| 2016/0330233 A1* | 11/2016 | Hart .................. H04L 63/20 |
| 2016/0342606 A1 | 11/2016 | Mouel et al. |
| 2016/0350442 A1 | 12/2016 | Crosby |
| 2016/0364307 A1 | 12/2016 | Garg et al. |
| 2017/0013003 A1 | 1/2017 | Samuni et al. |
| 2017/0019678 A1 | 1/2017 | Kim et al. |
| 2017/0063896 A1 | 3/2017 | Muddu et al. |
| 2017/0083380 A1 | 3/2017 | Bishop et al. |
| 2017/0126712 A1 | 5/2017 | Crabtree et al. |
| 2017/0139763 A1 | 5/2017 | Ellwein |
| 2017/0149802 A1 | 5/2017 | Huang et al. |
| 2017/0193110 A1 | 7/2017 | Crabtree et al. |
| 2017/0206360 A1 | 7/2017 | Brucker et al. |
| 2017/0257375 A1* | 9/2017 | Dulkin .................. H04L 63/20 |
| 2017/0322959 A1 | 11/2017 | Tidwell et al. |
| 2017/0323089 A1 | 11/2017 | Duggal et al. |
| 2018/0197128 A1 | 7/2018 | Carstens et al. |
| 2018/0300930 A1 | 10/2018 | Kennedy et al. |
| 2019/0082305 A1 | 3/2019 | Proctor |
| 2019/0095533 A1 | 3/2019 | Levine et al. |
| 2019/0260804 A1* | 8/2019 | Beck .................. G06F 21/556 |
| 2021/0105285 A1* | 4/2021 | Simakov .......... G06Q 30/0185 |
| 2021/0297447 A1* | 9/2021 | Crabtree .......... H04L 63/1416 |

* cited by examiner

Exemplary Method for Host-Level Detection of Pass-the-Ticket Attacks

HOST-LEVEL TICKET FORGERY DETECTION AND EXTENSION TO NETWORK ENDPOINTS

CROSS-REFERENCE TO RELATED APPLICATIONS

Priority is claimed in the application data sheet to the following patents or patent applications, each of which is expressly incorporated herein by reference in its entirety:
None.

BACKGROUND OF THE INVENTION

Field of the Art

The present invention is in the field of cybersecurity for computer networks, and more particularly to host-level Kerberos authentication ticket forgery detection and extension of the host-level ticket forgery detection to network endpoints.

Discussion of the State of the Art

Detecting Kerberos ticket reuse attacks on a network is difficult. As an example, pass-the-ticket (PtT) attacks where a valid ticket is reused by an attacker are difficult to detect because pass-the-ticket attacks behave in a manner expected for valid tickets. The industry standard way of detecting PtT attacks is to use user behavioral analysis (UEBA) anomalies or heuristics that essentially guess when a ticket may be reused according to relevant previous observations and resultant models. These methods are unreliable when applied to PtT attacks, in part because Active Directory supports delegation as core operational capability. Kerberos delegation allows a service to authenticate to other services on behalf of a user, forwarding the user's credentials securely, allowing access to resources across multiple tiers without requiring users to reauthenticate. Since ticket reuse by an account other than the primary user, or presented through a common source IP via VPN concentrators or NAT, are expected behaviors, detecting PtT attacks using UEBA heuristics is unreliable.

What is needed is a means to detect and prevent PtT and similar cyberattacks relying on credential misuse, modification, or forgery by identifying circumstances where tickets belonging to the wrong user are injected into memory and used to request access to network resources.

SUMMARY OF THE INVENTION

Accordingly, the inventor has conceived and reduced to practice, a system and method for detection and prevention of ticket forgery cyberattacks by improving host-level analytics and monitoring and extending the improved host-level analytics and monitoring on endpoints of a network to include additional data and analytics not present in current antivirus and endpoint detection and response tools. The methodology described herein comprises the use of an authentication ticket log extension utility which queries the local ticket cache for every logon session, and generates additional custom data as a part of an event log stream with the additional data such as a start time, end time, renew time, and related session data. This comprehensive log extension data can be used locally for analytics and detections and/or consolidated across multiple endpoints to improve the ability to identify certain types of ticket forgery cyberattacks by comparing the user session name with the client name identified in the ticket presented for access to network resources and other means. This host-level ticket forgery detection can be extended to many network endpoints for additional security and observability.

In a pass-the-ticket attack, an attacker exploits the authentication mechanism of the Windows domain environment to gain unauthorized access to network resources. The attack primarily targets the Kerberos authentication protocol, which is commonly used for authentication in Windows domains.

Detecting ticket forgery cyberattacks on a network is difficult. As an example, pass-the-ticket (PtT) attacks where a valid ticket is reused by an attacker are difficult to detect because pass-the-ticket attacks behave in a manner expected for valid tickets. The industry standard way of detecting PtT attacks is to use user behavioral analysis (UEBA) anomalies or heuristics that essentially guess when a ticket may be reused. These methods are unreliable when applied to PtT attacks, in part because Active Directory supports delegation as core operational capability. Kerberos delegation allows a service to authenticate to other services on behalf of a user, forwarding the user's credentials securely, allowing access to resources across multiple tiers without requiring users to reauthenticate. Since ticket reuse by an account other than the primary user, or presented through a common source IP via VPN concentrators or NAT, are expected behaviors, detecting PtT attacks using UEBA heuristics is unreliable Host-level analytics and monitoring can be used to detect PtT attacks by storing every logon session on a network host, querying the local ticket cache, and generating additional custom data as a part of an event log stream such as a start time, end time, renew time, and related session data. This comprehensive log extension data can be used to identify cyberattacks by comparing the user session name with the client name identified in the ticket presented for access to network resources. This methodology allows detection and prevention of PtT attacks by identifying circumstances where tickets belonging to the wrong user are injected into memory and used to request access to network resources. This host-level analysis and monitoring can be extended to all network endpoints and exceeds what antivirus and endpoint detection and response devices include in collection and analysis (either local or consolidated) today.

According to a preferred embodiment, a cybersecurity system for host-level pass-the-ticket forgery detection is disclosed, comprising: a first computing device comprising a memory, a processor, and a non-volatile data storage device; a authentication ticket log extension database stored on the non-volatile data storage device, the authentication ticket log extension database comprising additional log data for a ticket-granting-type cybersecurity protocol, the additional log data comprising a start time, an end time, and a renewal time for each ticket issued by the ticket-granting-type cybersecurity protocol; a ticket granting security system comprising a first plurality of programming instructions stored in the memory which, when operating on the processor, causes the first computing device to: install a ticket granting log extension utility on one or more second computing devices; receive the additional log data generated by the ticket granting log extension utility; monitor access requests by a client operating on a local host computer for access to resources on a network; identify a ticket generated by the ticket-granting-type cybersecurity protocol associated with an attempted access of a network resource, the ticket comprising a client name; retrieve a user session name for the attempted access; compare the client name with the user session name; and where there is a mismatch between the client name and user session name, send a destroy ticket command to a key distribution service using the ticket-granting-type cybersecurity protocol; and the ticket granting log extension utility comprising a second plurality of programming instructions operating on the one or more second computing devices which causes each second computing device to: enumerate every logon session on the second computing device; query the local ticket cache of the second computing device to obtain a log data stream for the logon session; generate the additional log data to supplement the log data stream; and store the additional log data as part of the log data stream.

According to another preferred embodiment, a cybersecurity method for host-level pass-the-ticket forgery detection is disclosed, comprising the steps of: storing a authentication ticket log extension database on a non-volatile data storage device of a first computing device comprising a memory, a processor, and the non-volatile data storage device, the authentication ticket log extension database comprising additional log data for a ticket-granting-type cybersecurity protocol, the additional log data comprising a start time, an end time, and a renewal time for each ticket issued by the ticket-granting-type cybersecurity protocol; using a ticket granting security system operating on the first computing device to perform the steps of: installing a ticket granting log extension utility on one or more second computing devices; receiving the additional log data generated by the ticket granting log extension utility; monitoring access requests by a client operating on a local host computer for access to resources on a network; identifying a ticket generated by the ticket-granting-type cybersecurity protocol associated with an attempted access of a network resource, the ticket comprising a client name; retrieving a user session name for the attempted access; comparing the client name with the user session name; and where there is a mismatch between the client name and user session name, sending a destroy ticket command to a key distribution service using the ticket-granting-type cybersecurity protocol; and using the ticket granting log extension utility operating on the one or more second computing devices to perform the following steps for each second computing device: enumerating every logon session on the second computing device; querying the local ticket cache of the second computing device to obtain a log data stream for the logon session; generating the additional log data to supplement the log data stream; and storing the additional log data as part of the log data stream.

According to an aspect of an embodiment, the first computing device is the local host computer, and the ticket granting security system is operating on the local host computer.

According to an aspect of an embodiment, the first computing device is a cloud-based server separate from the local host computer, and the ticket granting security system is operating on the cloud-based server, monitoring access requests by the local host computer.

BRIEF DESCRIPTION OF THE DRAWING FIGURES

DETAILED DESCRIPTION OF THE INVENTION

Figure 1:
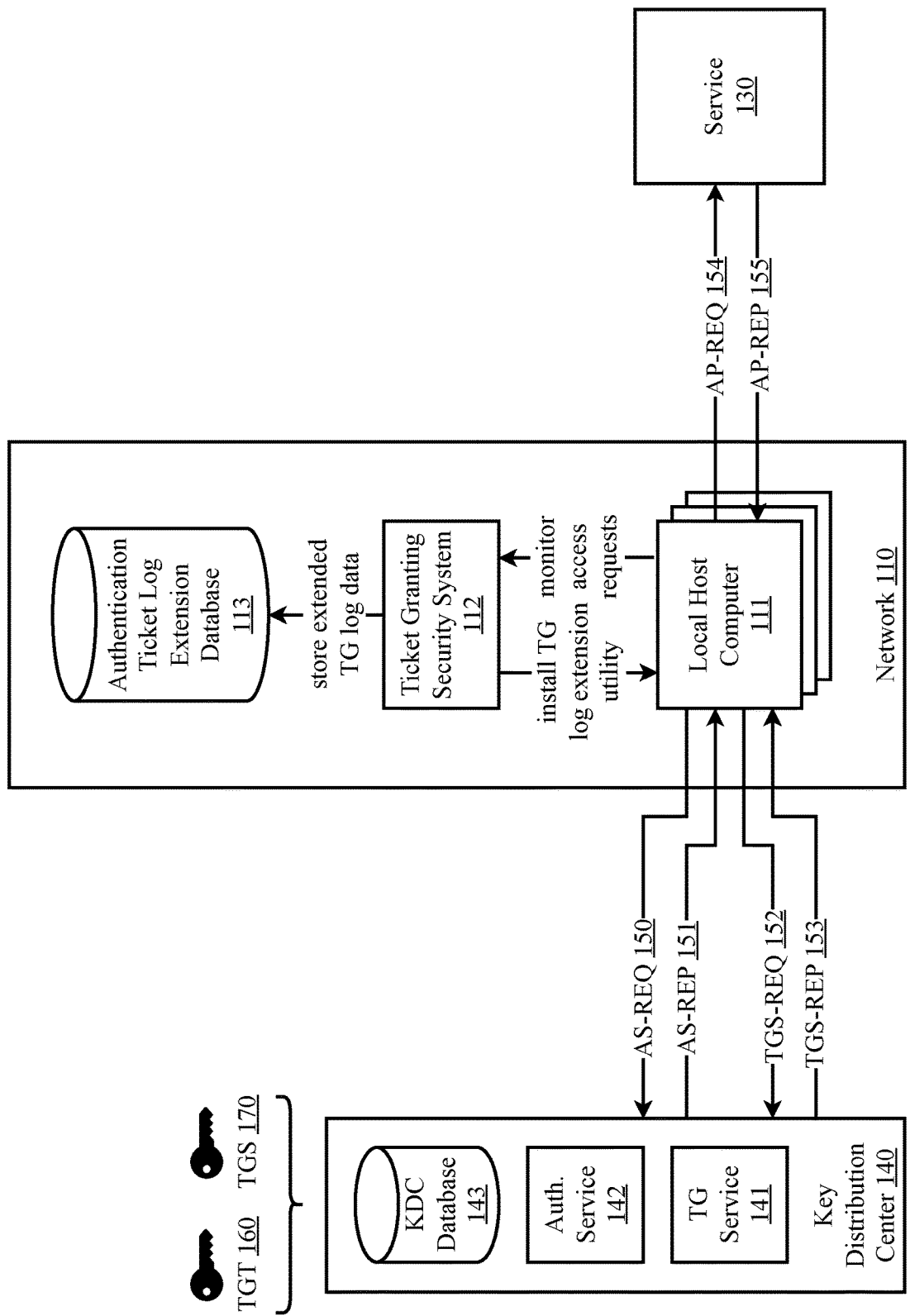
FIG. 1 is a block diagram illustrating an exemplary system architecture for host-level ticket forgery detection.

The inventor has conceived, and reduced to practice, a system and method for detection and prevention of ticket forgery cyberattacks by improving host-level analytics and monitoring and extending the improved host-level analytics and monitoring to endpoints of a network. The methodology described herein comprises the use of a ticket-granting log extension utility which stores every logon session on a network, queries the local ticket cache, and generates additional custom data as a part of an event log stream such as a start time, end time, renew time, and related session data. This comprehensive log extension data can be used to identify certain types of ticket forgery cyberattacks by comparing the user session name with the client name identified in the ticket presented for access to network resources and other means. This host-level ticket forgery detection can be extended to network endpoints for additional security.

In a pass-the-ticket attack, an attacker exploits the authentication mechanism of the operating system domain environment to gain unauthorized access to network resources. The attack primarily targets ticket-granting-type authentication protocols (such as Kerberos, which is commonly used in Windows operating systems).

Detecting ticket forgery cyberattacks on a network is difficult. As an example, pass-the-ticket (PtT) attacks where a valid ticket is reused by an attacker are difficult to detect because pass-the-ticket attacks behave in a manner expected for valid tickets. The industry standard way of detecting PtT attacks is to use user behavioral analysis (UEBA) anomalies or heuristics that essentially guess when a ticket may be reused. These methods are unreliable when applied to PtT attacks, in part because Active Directory supports delegation as core capability. Kerberos delegation allows a service to authenticate to other services on behalf of a user, forwarding the user's credentials securely, allowing access to resources across multiple tiers without requiring users to reauthenticate. Since ticket reuse by an account other than the primary user is an expected behavior detecting PtT attacks using UEBA heuristics is unreliable.

Host-level analytics and monitoring can be used to detect PtT and other ticket-granting-type attacks by collecting and storing every logon session on a network host, querying the local ticket cache, and generating additional custom data as a part of an event log stream such as a start time, end time, renew time, and related session data. This comprehensive log extension that exceeds present day antivirus and EDR software data collection provides sufficient data to identify these particular forms of additional cyberattacks, for example, by comparing the user session name with the client name identified in the ticket presented for access to network resources. It also provides information that can improve the granularity of observability, security and data utilization in the enterprise if aggregated and used in other broader downstream processes. This methodology allows detection and prevention of PtT and other ticket-granting-type attacks by identifying circumstances where tickets belonging to the wrong user are injected into memory and used to request access to network resources. This host-level analysis and monitoring can be extended to network endpoints for additional security.

A PtT attack typically follows a series of stages: initial compromise, ticket theft, credential dumping, ticket usage, and privilege escalation and lateral movement, all of which exploit vulnerabilities in the Kerberos protocol's trust model. The attacker gains initial access to a system within the target Windows domain. This can be achieved through various methods, such as exploiting vulnerabilities, obtaining compromised credentials, or employing social engineering techniques or payouts/kompromat. Once present on the compromised system, the attacker's goal is to extract valid Kerberos ticket-granting tickets (TGTs) or Service Tickets (TGS). These tickets are obtained by targeting the Local Security Authority Subsystem Service (LSASS) process memory, where the tickets of logged-in users are stored. The attacker employs various techniques and tools to extract the tickets from the LSASS process memory. Commonly used tools include Mimikatz, ProcDump, or similar memory-dumping utilities. By extracting the tickets, the attacker gains access to valid credentials issued by the Key Distribution Center (KDC). Armed with the stolen tickets, the attacker reuses them to authenticate themselves as the targeted user. In the Kerberos authentication process, when a service ticket is presented to a target server, the server trusts the ticket if it is signed by the domain's Key Distribution Center (KDC). By reusing valid tickets, the attacker can present legitimate service credentials to gain access to network resources without needing the user's actual credentials. With unauthorized access to a system or service, the attacker can explore the network, escalate privileges, and move laterally to compromise additional systems or access sensitive information. This allows them to expand their control and potentially cause more significant harm.

PtT attacks can be detected and prevented by installing a ticket granting log extension utility that enumerates every logon session on a system, queries the local ticket cache, and generates additional custom log data as a part of the event log data stream (e.g., Windows Event Log (WEL) stream), and using a ticket granting security service to monitor access requests to resources on a network, and performing various comparisons of the access request with the log data, as supplemented by the additional custom log data. This capability provides additional data about tickets that can't be obtained from the standard log data.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

DETAILED DESCRIPTION OF DRAWING FIGURES

FIG. 1 is a block diagram illustrating an exemplary system architecture for host-level ticket forgery detection. In this embodiment, a ticket granting security system 112 is implemented in an organization's network and domain. Ticket granting security system 112 comprises a authentication ticket log extension database 113 and a ticket granting log extension utility installed on each local host computer 111 as part of the local host's security protocol (e.g., as an extension to the Kerberos protocol) which enumerates every logon session on the local host, queries the local ticket cache, and generates additional custom data as a part of the log data stream (e.g., a Windows Event Log (WEL) stream) with the additional data. The ticket granting log extension utility provides additional data about tickets that is not contained in typical security protocol logs, such as a ticket start time, a ticket end time, a ticket renewal time, and other related session data, which may be stored in authentication ticket log extension database 113 or may be stored as part of the log data stream if the security protocol being used allows additional information to be stored as part of the log data.

Note that network 110 embodies many different configurations, all of which are included herein. For example, network may be a localized network such as in a single office building, a wide area network spanning multiple buildings or a campus of buildings, a virtual private network spanning multiple locations separate from one another, among other configurations. Network 110 should be considered to include distributed or remote logins (i.e., those in which a plurality of local host computers log in from remote locations for remote or hybrid work locations). Network 110 also includes configurations involving midservers which act as interfaces between security perimeters established around or within network 110 and external services such as service 130 and key distribution center 140. Network 110 also includes distributed computing or cloud-based computing wherein portions of network are located on distributed or cloud-based computing environments.

Ticket granting security system 112 is installed on every local host where Kerberos ticket monitoring is needed. Local host computers may, in many cases, also be end point computers for network 110. An endpoint computer, in the context of computer networking and cybersecurity, refers to a device that acts as a point of entry or exit for data on a network. It is typically a user-operated device such as a desktop computer, laptop, smartphone, or tablet that interacts with a network or accesses network resources. Endpoints are called as such because they represent the endpoints of a network connection or communication. They can initiate communication with other devices or receive communication from other devices. Endpoints are usually equipped with networking capabilities and are connected to a network infrastructure, such as a local area network (LAN) or the internet, allowing them to send and receive data packets.

Securing of endpoint computers is particularly important in the field of cybersecurity as they are often targeted by malicious actors seeking to gain unauthorized access to networks or exploit vulnerabilities. Therefore, securing endpoint devices is crucial to maintaining the overall security of a network. This is typically achieved through various security measures, such as installing antivirus software, implementing firewalls, using strong passwords, and keeping software up to date with the latest security patches. Here, ticket granting security system 112 provides an additional layer of protection beyond these security protocols.

As one example of usage, ticket granting security system 112 can detect PtT attacks by comparing the user session name with the client name identified in the ticket. A PtT involves tickets presented as being from one user session showing up in another user's login sessions. The session information is only available on local host computer 111. As ticket granting security system 112 is installed on each local host computer 111, it has access to local host computer's 111 ticket granting security protocol logs and can operate as an independent security protocol agent. For each login of local host computer 111 to a network resource, ticket granting security system 112 compares the user session name with the client name identified in the ticket. A mismatch between the user session name and client name indicates that a PtT attack may be occurring. Ticket granting security system 112 can then either flag the issue for human intervention or can take an automated security action such as sending a ticket deletion requestion to key distribution center 140.

As another example of usage, ticket granting security system 112 with its additional data (e.g., ticket start times, ticket end times, ticket renewal times, etc.) can be used to detect other forged ticket attacks. Common industry heuristics for forged ticket detections are enhanced by ticket granting security system 112 simpler and more accurate detection capabilities. For example, checking for abnormal ticket expiration and renew times is a cybersecurity heuristic to detect forged tickets and is the primary method of detecting attacks like Golden Tickets and other types of ticket manipulation. However, current methodologies for checking for abnormal ticket expiration and renew times are complicated because the log data does not store this information about tickets, so other means of doing the checking must be used. Ticket granting security system 112 with its additional data (e.g., ticket start times, ticket end times, ticket renewal times, etc.) provides a simple and direct means for performing such checking, as the data necessary to perform the checking was stored at the time of ticket creation and can be readily accessed.

Ticket granting security system 112 operates as part of a ticket granting security protocol such as Kerberos. As Kerberos is a well-known current security protocol, it will be used herein as an example, but the disclosures herein are not limited to Kerberos and apply to any ticket granting security type protocol.

The Kerberos process begins when a user operating on a local host computer 111 (joined to the domain) attempts to access a service 130 within the domain. Many services rely on the Kerberos authentication service such as Microsoft Windows Active Directory, FTP, SSH, POP, SMTP, NFS, Samba and others. The client machine 111 sends authentication information along with a timestamp and sends this as a message to a key distribution center (KDC) 140 comprising a ticket granting service (TGS) 141 and an authorization service (AS) 142. This message is referred to as AS-REQ 150 (authentication server-request) and is the first step in the Kerberos process.

Upon authentication, the KDC 140 issues a ticket-granting-ticket (TGT) 160 to the client encrypted with a special user on the domain controller known as krbtgt. The client cannot decrypt this ticket since the krbtgt hash is only stored on the domain controller and nowhere else. This step is known as the authentication server response or AS-REP 151.

In the third step, the client sends the TGT 160 back to the KDC 140 along with a request to access a service 130. This is called the TGS-REQ 152. The KDC 140 subsequently sends the client back a ticket-granting-service ticket 170 which allows a client operating on the local host computer 111 to access the actual service the user is interested in. This is the TGS-REP 153 step. During a golden ticket attack, as an example, the krbtgt hash is stolen and a forged TGS-REQ 152 is made effectively bypassing the client authentication step and granting the threat actor a legitimate TGS 170 ticket.

The fifth step in the Kerberos process occurs when the client operating on the local host computer 111 presents the TGS 170 ticket to the service 130 for evaluation. This step is known as AP-REQ 154. The final step, AP-REP 155, is a response from the service 130 either allowing or prohibiting access to the client operating on the local host computer 111 if the user is authorized. During a silver ticket attack, as an example, the attacker manages to extract the password or NT hash of a service account that allows them to forge a false TGS 170 ticket bypassing the KDC 140 altogether.

At each stage in the Kerberos process, a data packet is sent between the client operating on the local host computer 111 and either the KDC 140 or a service 130. In each instance, a packet capturing agent 511 (a packet capturing agent intercepts data being transmitted over a network) passively captures the data packet and stores the information contained inside in a multi-dimensional time-series database (MDTSDB) 512. The MDTSDB 512 stores the retrieved information in a ledger. Information from the data packets provide data points which may be stored in 113 and, depending on configuration, may be stored in the form of a graph which can be queried by graph traversal tools.

Other Kerberos attacks may be derived from captured Kerberos traffic as supplemented by the additional data supplied by ticket granting log extension utility. For example, an authoritative list known as a whitelist 514 or access-control list may be kept and contains all authorized Domain Controllers (DC) within the enterprise network along with additional data stored in authentication ticket log extension database 113. Any attempt by a device to perform a Directory Replication Service (DRS) remote procedure call (or OpNum) of a certain number, namely 3, 5, and 17, is compared against the whitelist 514. If the DRS remote procedure call originates from a device not in the white list, this would indicate a DCSync (OpNum 3) attack or a DCShadow (OpNum 5 or 17) attack.

Similarly to the PtT detection process described above, ticket granting security system 112 can detect PtT attacks by comparing a change in the source IP address of a TGT within a narrow time-window. As an additional example, ticket granting security system 112 can detect Skeleton Key attacks by storing information about encryption levels used in granting tickets, and determining when encryption has been downgraded (typically from AES-128/256 to something weaker).

Note that some embodiments may not rely strictly on analytics captured by, and analyzed on, the local host computer. For example, the data for analytics could be captured by one local host computer and analyzed on another, or the results from capture and analysis by one local host computer may be applied to another local host computer with similar configurations.

Figure 2:
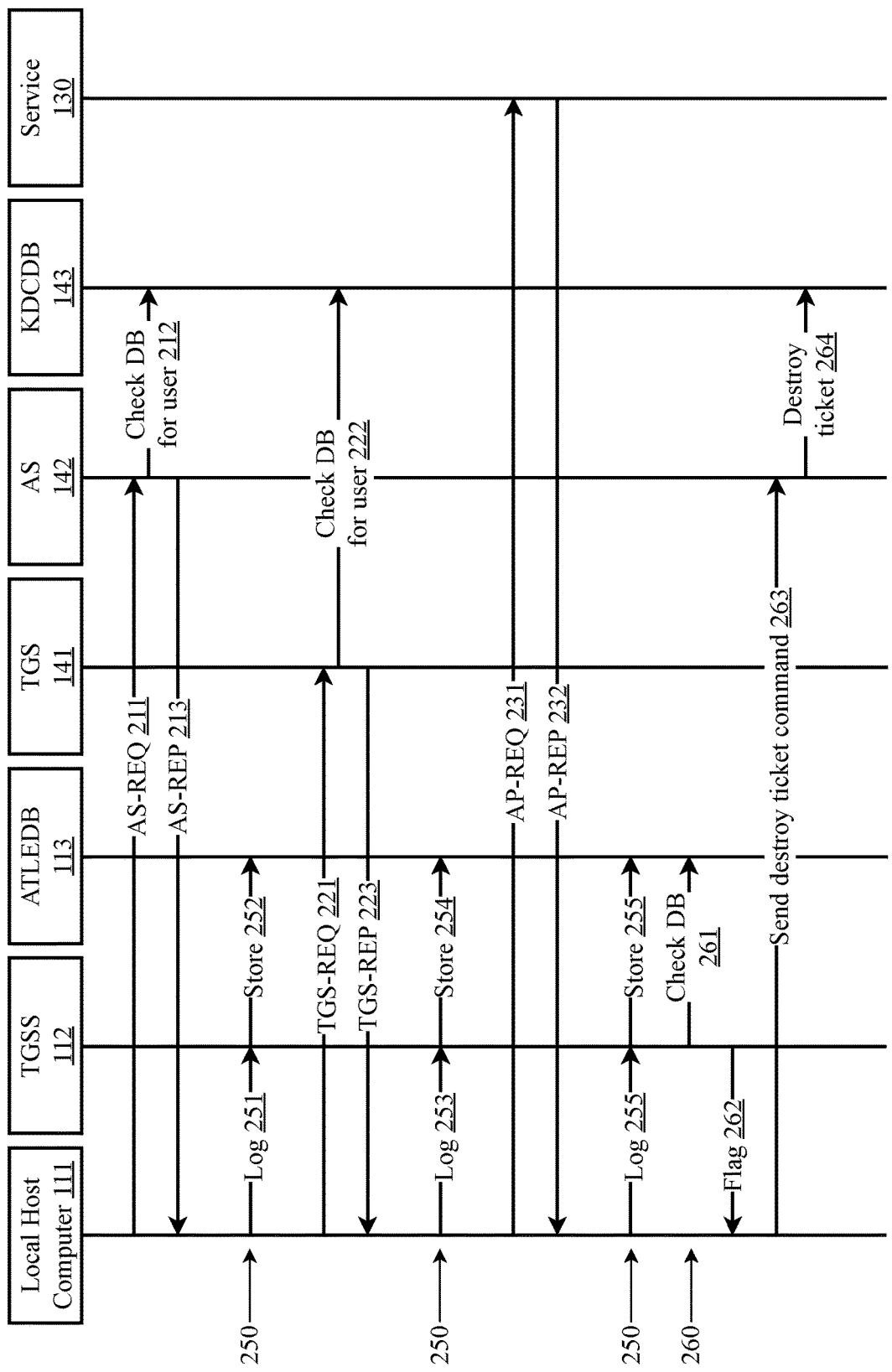
FIG. 2 is a messaging diagram illustrating an exemplary message flow for host-level ticket forgery detection.

FIG. 2 is a messaging diagram illustrating an exemplary message flow for host-level ticket forgery detection. This messaging diagram shows a typical Kerberos protocol operation with the operations of ticket granting security service (TGSS) 112 providing additional security protocols comprising a series of log and store steps 250 which generate and store the additional log data described above, and a verification procedure 260 showing an implementation of a PgT attack detection.

A client operating on local host computer 111 sends an AS-REQ 211 to authorization service 142 operating on key distribution center 140. Authorization service checks 212 key distribution center database (KDCDB) 143 for existence of the user in the database associated with the client operating on local host computer 111. Authorization service 142 sends AS-REP 213 back to local host computer 111 authorizing granting of ticket. TGSS 112 captures log data 251 and stores it 252 in authentication ticket log extension database 113. Local host computer 111 sends TGS-REQ 221 to ticket granting service 141 operating on key distribution center 140. Ticket granting service 141 checks 222 key distribution center database (KDCDB) 143 for existence of the user in the database associated with the client operating on local host computer 111. Ticket granting service 141 sends TGS-REP 223 back to local host computer 111 granting ticket granting ticket. TGSS 112 captures log data 251 and stores it 252 in authentication ticket log extension database 113. Local host computer 111 sends AP-REQ 231 to service 130 to which access has been granted. Service 130 sends AP-REP 232 back to local host computer 111 granting access. TGSS 112 captures log data 251 and stores it 252 in authentication ticket log extension database 113.

At this point, verification procedure 260 is initiated in which TGSS 112 detects PtT attacks by comparing 261 the user session name on the local host computer with the client name identified in the ticket granting access to service 130. Upon discovery of a mismatch between user session name on the local host computer with the client name, TGSS 112 flags 262 the ticket as a possible PtT attack and causes local host computer 111 to send a destroy ticket command 263 to authentication service 142 to destroy both the ticket granting ticket issued by ticket granting service 141 and the ticket granting access to service 130. Authentication service 142 destroys the ticket in key distribution center database 143. The destruction of the tickets prevents further intrusion into network 110 by the detected PtT attack.

Figure 3:
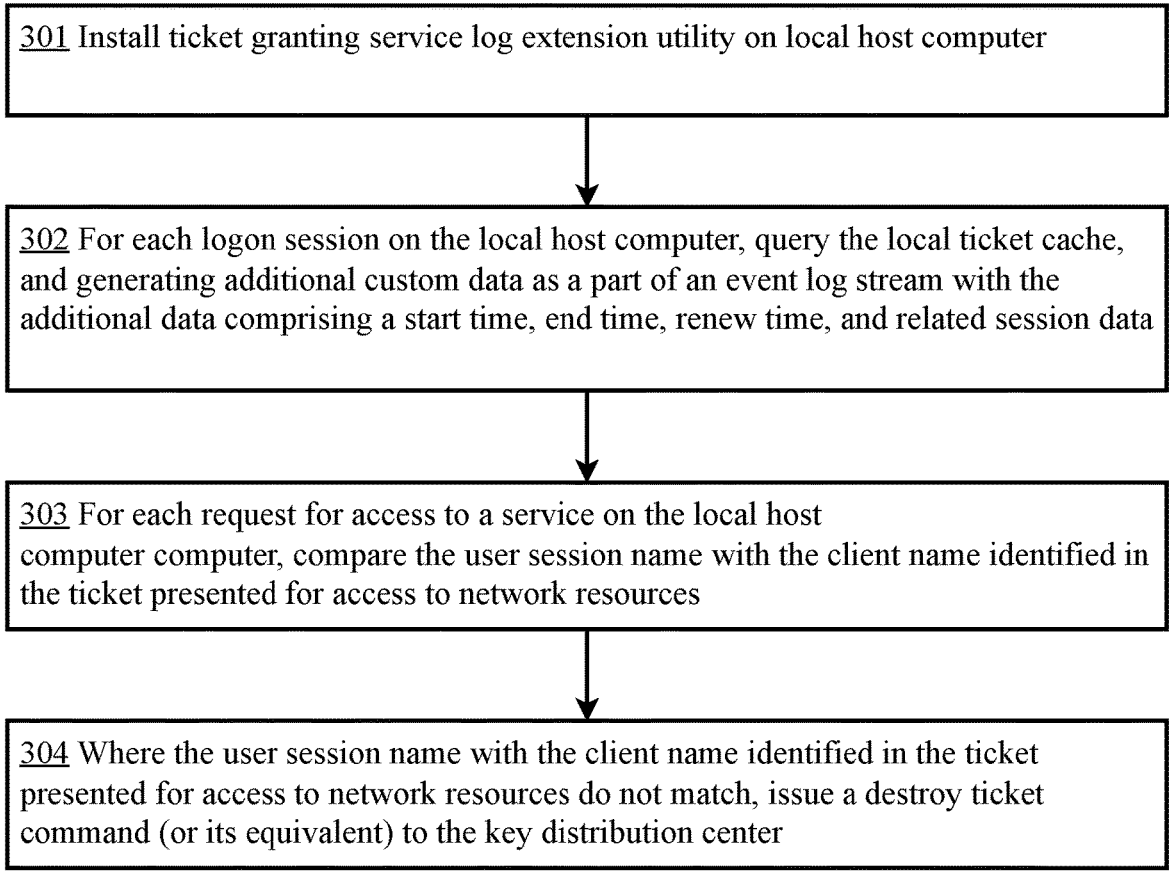
FIG. 3 is a flow diagram illustrating an exemplary detection of a pass-the-ticket attack using host-level ticket forgery detection to detect mismatched user names.

FIG. 3 is a flow diagram illustrating an exemplary detection of a pass-the-ticket attack using host-level ticket forgery detection to detect mismatched user names. At step 301, a ticket granting service log extension utility is installed on local host computer. At step 302, for each logon session on the local host computer, the local ticket cache is queried, and additional custom data is generated as a part of an event log stream such as a start time, end time, renew time, and related session data. At step 303, for each request for access to a service on the local host computer, the user session name is compared with the client name identified in the ticket presented for access to network resources. At step 304, where the user session name with the client name identified in the ticket presented for access to network resources do not match, a destroy ticket command (or its equivalent) is issued to the key distribution center. The destroy ticket command may be issued for a single ticket or for multiple tickets associated with local host computer 111 or a login event.

Figure 4:
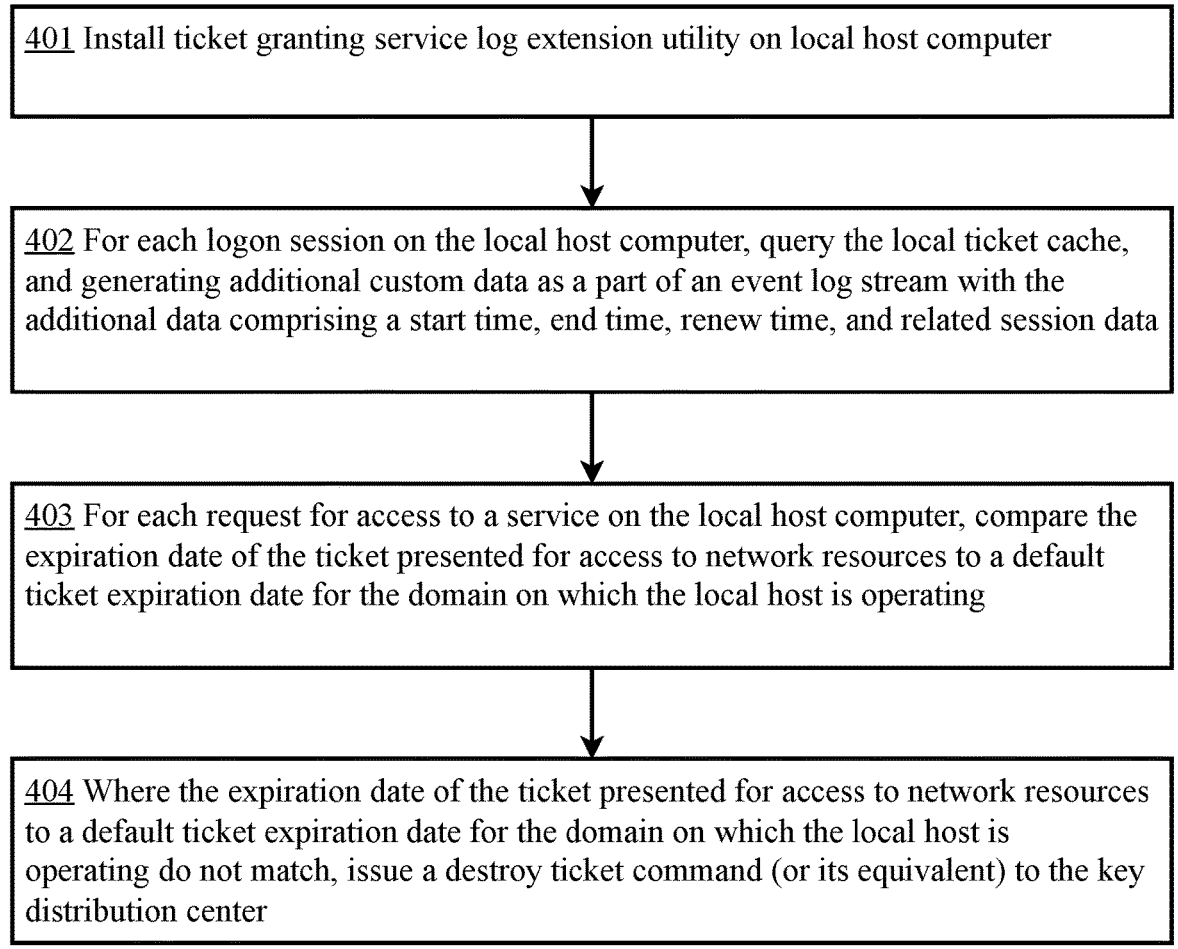
FIG. 4 is a flow diagram illustrating an exemplary detection of ticket forgery using host-level ticket forgery detection to detect unusual ticket expiration times.

FIG. 4 is a flow diagram illustrating an exemplary detection of ticket forgery using host-level ticket forgery detection to detect unusual ticket expiration times. At step 401, a ticket granting service log extension utility is installed on local host computer. At step 402, for each logon session on the local host computer, the local ticket cache is queried, and additional custom data is generated as a part of an event log stream such as a start time, end time, renew time, and related session data. At step 403, for each request for access to a service on the local host computer, the user session name is compared with the client name identified in the ticket presented for access to network resources. At step 404, where the expiration date of the ticket presented for access to network resources to a default ticket expiration date for the domain on which the local host is operating do not match, issue a destroy ticket command (or its equivalent) to the key distribution center. The destroy ticket command may be issued for a single ticket or for multiple tickets associated with local host computer 111 or a login event.

Figure 5:
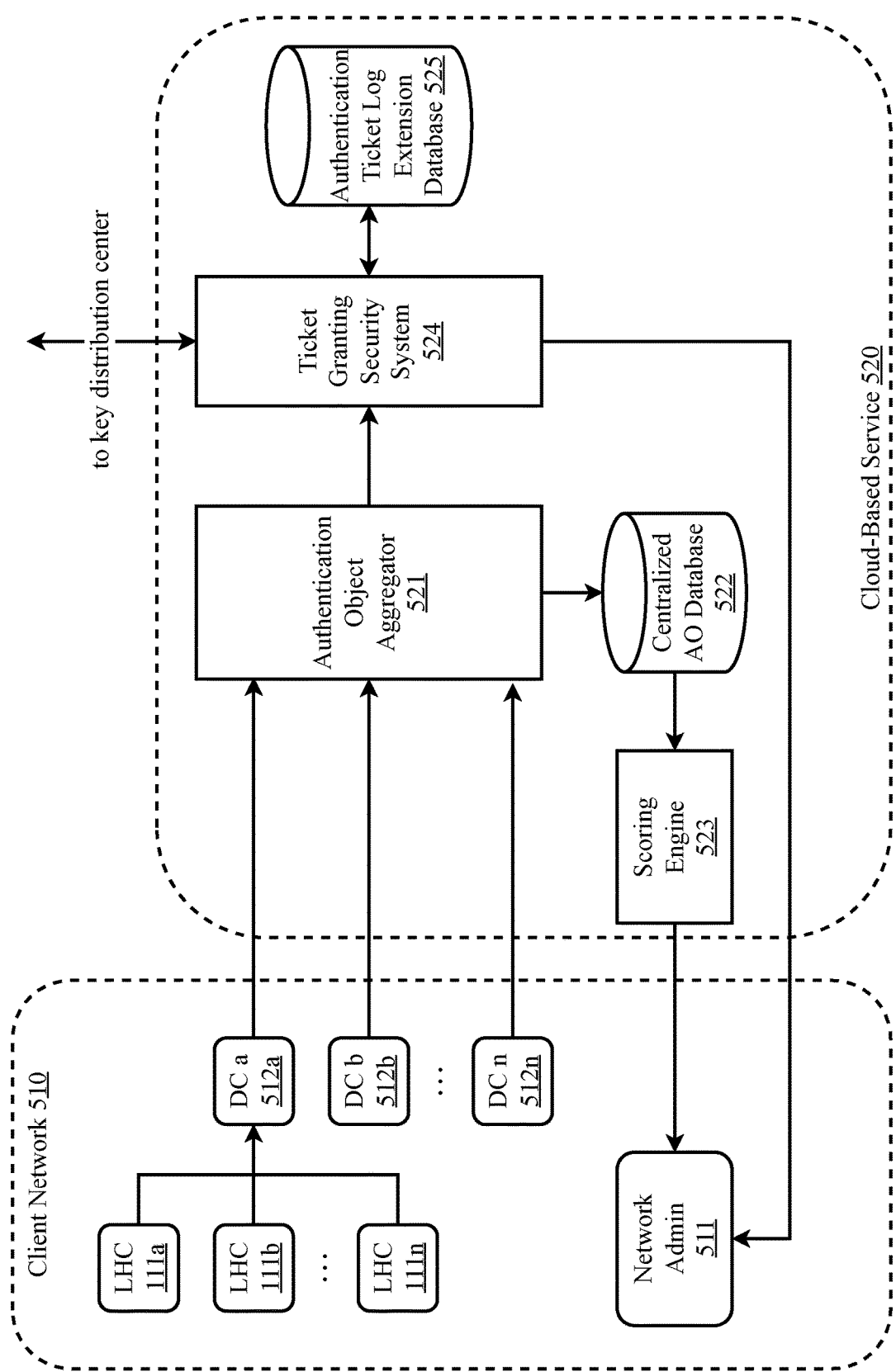
FIG. 5 is a flow diagram illustrating an exemplary system architecture for extension of host-level ticket forgery detection to SAML-based and NTML-based security protocols using global authentication record validation.

FIG. 5 is a flow diagram illustrating an exemplary system architecture for extension of host-level ticket forgery detection to SAML-based and NTML-based security protocols using global authentication record validation. In this example, a client network is protected by a cloud-based service 520 which implements zero trust network security combined with stateful deterministic authentication object tracking and assessment of the level of threat already existing within a network at the local host level. Client network 510 comprises one or more domain controllers 512a-n, each of which is a domain controller for one or more local host computers 111a-n. A ticket granting log extension utility is installed on each local host computer 111a-n. However, instead of having ticket granting security system operating at the domain level or at the client network 510 level, ticket granting security system of this embodiment 524 operates at the cloud level, but otherwise has the same or similar functionality to ticket granting security system as described above in previous embodiments.

A network administrator 511 is responsible for establishing network access controls (NACs) which typically comprise settings for the Active Directory (AD) service for each domain controller 512a-n plus implementation of some authentication protocol such as Kerberos, New Technology LAN Manager (NTML), or Security Assertion Markup Language (SAML), OpenID, OAuth operating on each domain controller 512a-n. Each of these authentication protocols, however, has flaws and vulnerabilities that allow malicious actors to access resources within a network via cyberattacks such as silver ticket attacks and golden ticket attacks, in which the malicious actor is able to forge an authentication object, making it look as though it was issued by the authentication protocol. The malicious actor then uses the forged authentication object to access network resources. For purposes of clarity, Single Sign-On (SSO) is defined as a network security protocol that allows access to network resources within a single domain or organization, while a federated authentication allows access to network resources across domains or organizations. Kerberos and NTML are SSO network security protocols, while SAL, OpenID, and OAuth are federated network security protocols.

An implementation of zero trust network security which uses stateful, deterministic detection of authentication object forgeries provides greater security than heuristic methods, which rely on estimates or guesses as to whether forgeries may exist based on expected network behaviors. To implement a stateful, deterministic method of detecting authentication forgeries, a complete record of every authentication issued by a network must be kept so that the original authentication can be concretely identified for every authentication object presented for every attempted access to a network resource. This makes the detection of authentication forgeries both stateful (in that the current state of every authentication object can be determined) and deterministic (in that the validity of every authentication object presented for every request for access to network resources can be explicitly identified). Stateful, deterministic detection of authentication object forgeries provides greater security than heuristic methods, which rely on estimates or guesses as to whether forgeries may exist based on expected network behaviors.

Thus, cloud-based service 520 comprises an authentication object aggregator 521 for gathering of all authentication objects issued by domain controllers 512a-n operating their authentication protocols, a centralized database 522 for storing a complete record of every authentication issued by a client network 510 so that the original authentication can be concretely identified for every authentication object presented for every attempted access to a network resource, and a scoring engine 523 for scoring the completeness of the authentication observations, assessing the quality of the authentication observations, and assigning organization-specific penalty functions.

Ticket granting security system 524 provides the additional functionality described above for other embodiments, except that it operates on in the cloud instead of on each local host computer 111a-n. More specifically, as with previous embodiments, a ticket granting log extension utility is installed on each local host computer 111a-n as part of the local host's security protocol (e.g., as an extension to the Kerberos protocol) which enumerates every logon session on the local host, queries the local ticket cache, and generates additional custom data as a part of the log data stream (e.g., a Windows Event Log (WEL) stream) with the additional data. The ticket granting log extension utility provides additional data about tickets that is not contained in typical security protocol logs, such as a ticket start time, a ticket end time, a ticket renewal time, and other related session data, which may be stored in authentication ticket log extension database 113 or may be stored as part of the log data stream if the security protocol being used allows additional information to be stored as part of the log data. However, rather than storing the additional data in a local authentication ticket log extension database, the ticket granting log and the additional data generated by the ticket granting log extension utility is forwarded to cloud-based service 520.

As one example of usage, ticket granting security system 524 can detect PtT attacks by comparing the user session name with the client name identified in the ticket. A PtT involves tickets presented as being from one user session showing up in another user's login sessions. The session information is only available on local host computer 111, but is captured and forwarded to cloud-based service 520 by ticket granting log extension utility and stored in authentication ticket log extension database 525. As ticket granting log extension utility is installed on each local host computer 111, it has access to local host computer's 111 ticket granting security protocol logs and can operate as an independent security protocol agent. For each login of local host computer 111 to a network resource forwarded to cloud-based service 520, ticket granting security system 524 compares the user session name with the client name identified in the ticket. A mismatch between the user session name and client name indicates that a PtT attack may be occurring. Ticket granting security system 524 can then either flag the issue for human intervention or can take an automated security action such as sending a ticket deletion requestion to key distribution center.

As another example of usage, ticket granting security system 524 with its additional data (e.g., ticket start times, ticket end times, ticket renewal times, etc.) can be used to detect other forged ticket attacks. Common industry heuristics for forged ticket detections are enhanced by ticket granting security system's 524 simpler and more accurate detection capabilities. For example, checking for abnormal ticket expiration and renew times is a cybersecurity heuristic to detect forged tickets and is a primary method of detecting attacks like Golden Tickets and other types of ticket manipulation. However, current methodologies for checking for abnormal ticket expiration and renew times are complicated because the log data does not store this information about tickets, so other means of doing the checking must be used. Ticket granting security system 524 with its additional data (e.g., ticket start times, ticket end times, ticket renewal times, etc.) provides a simple and direct means for performing such checking, as the data necessary to perform the checking was stored at the time of ticket creation and can be readily accessed.

While this example shows a fully-cloud-based implementation in which authentication object aggregator 521, centralized database 522, and scoring engine 523 are all located on cloud-based service 520, other locations for these components are possible, including fully on-premise solutions (such as an a central office location having its own server network), and hybrid solutions wherein certain components are located on-premise and others are cloud-based. For example in another embodiment, authentication object aggregator 521 may be located on premise so as to avoid network traffic bottlenecks, and centralized database 522 and scoring engine 523 may be located on cloud-based service 520, with authentication object aggregator 521 transmitting issued authentications to centralized database 522 at off-peak times for network traffic.

Figure 6:
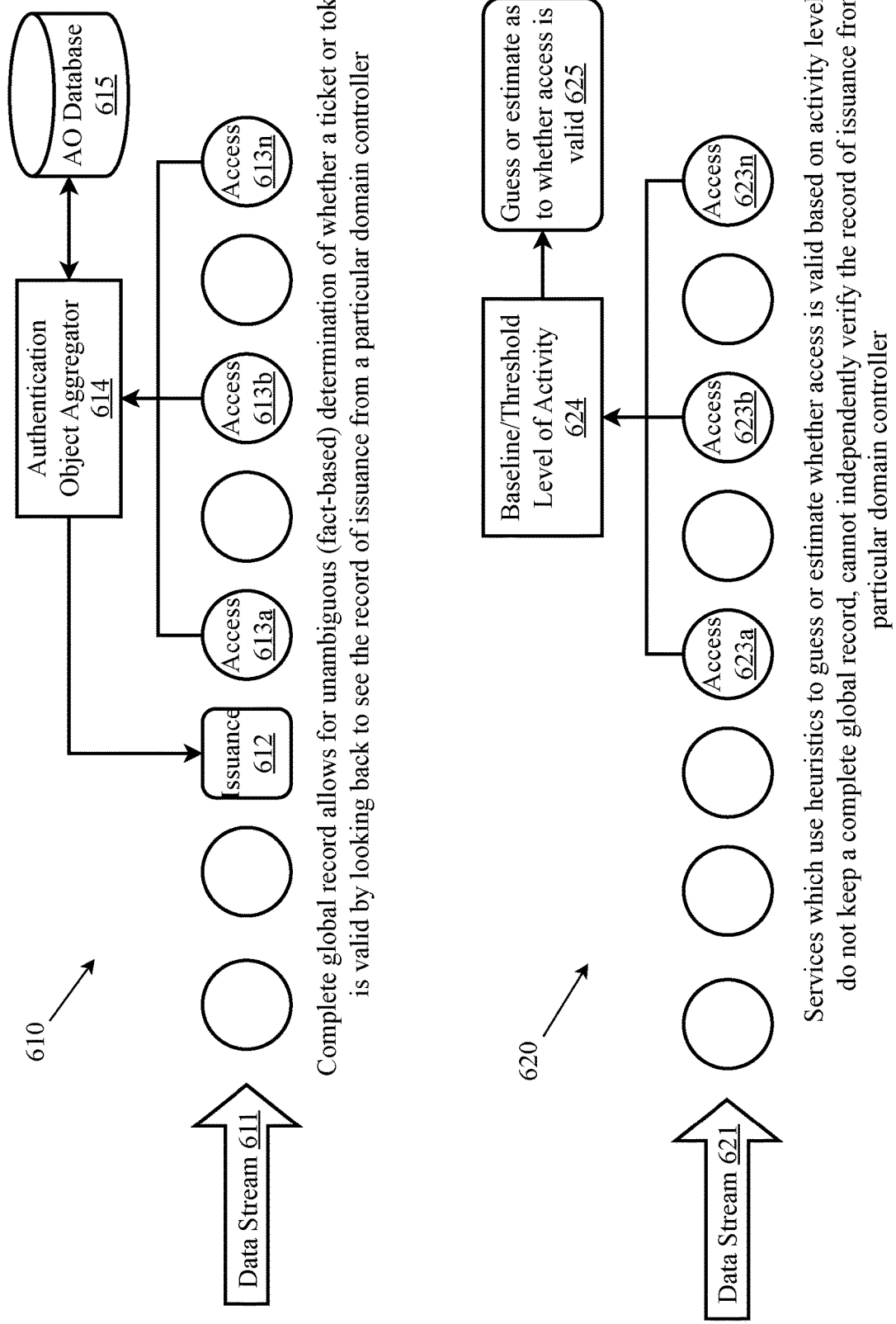
FIG. 6 is a diagram illustrating differences between global authentication record validation versus heuristic assessment validation.

FIG. 6 is a diagram illustrating differences between global authentication record validation versus heuristic assessment validation. To implement a stateful, deterministic method of detecting authentication forgeries, a complete record of every authentication issued by a network must be kept so that the original authentication can be concretely identified for every authentication object presented for every attempted access to a network resource. This makes the detection of authentication forgeries both stateful (in that the current state of every authentication object can be determined) and deterministic (in that the validity of every authentication object presented for every request for access to network resources can be explicitly identified). Stateful, deterministic detection of authentication object forgeries provides greater security than heuristic methods, which rely on estimates or guesses as to whether forgeries may exist based on expected network behaviors.

Here, heuristic detection of authentication object forgeries is contrasted with stateful, deterministic detection of authentication object forgeries. While heuristic detection is useful, it provides a lower level of protection because it relies on assumptions, estimates, and guesses instead of concrete, discretely-determinable facts.

In stateful, deterministic detection of authentication object forgeries as shown at 610, as streams of data 611 are received from a network every issuance 612 of an authentication object from every domain controller of the network is gathered by an authentication object aggregator 614 and stored in a centralized authentication object database 615. Each time an authentication object (i.e., ticket or token) is presented for access 613a-n to a network resource, authentication object aggregator 614 checks authentication object database 615 for existence in the database of the issuance claimed by that authentication object (i.e., ticket or token). If that issuance 612 exists in the database, the authentication object is granted access to the requested resource. If the issuance claimed by the authentication object does not exist in the database, then the authentication object is a forgery, which is statefully and deterministically confirmed by fact that no issuance of that authentication object can be found. Thus, in stateful, deterministic detection of authentication object forgeries, the existence of forgeries are facts which can be concretely and explicitly determines.

In heuristic detection of authentication object forgeries as shown at 620, no independent record of issuance of authentication objects is kept outside of the authentication protocol operating on each domain controller. Thus, as there is no independent, centralized way to confirm the authenticity of authentication objects, forgeries must be detected through application of heuristics (estimates, assumptions, and guesses). As streams of data 621 are received from a network, activity levels and behaviors of the network are stored 624 as baselines, and algorithms are applied (e.g., thresholds exceeded, unusual numbers of access requests made, accounts which have been dormant but are suddenly active, etc.) to guess or estimate as to whether access is valid 625. For example, each time an authentication object (i.e., ticket or token) is presented for access 623a-n to a network resource, that access attempt is stored as a data point. If the activity level of that authentication object suddenly increases, warnings may be issued to network administrators indicating that that authentication object may have been forged. As relies on assumptions, estimates, and guesses instead of concrete, discretely-determinable facts, it provides a lower level of protection than stateful, deterministic detection.

In the same way, ticket granting security system 524 with its additional log data generated by ticket granting log extension utility, can be used to detect forged ticket attacks using the methodologies discussed above.

Figure 7:
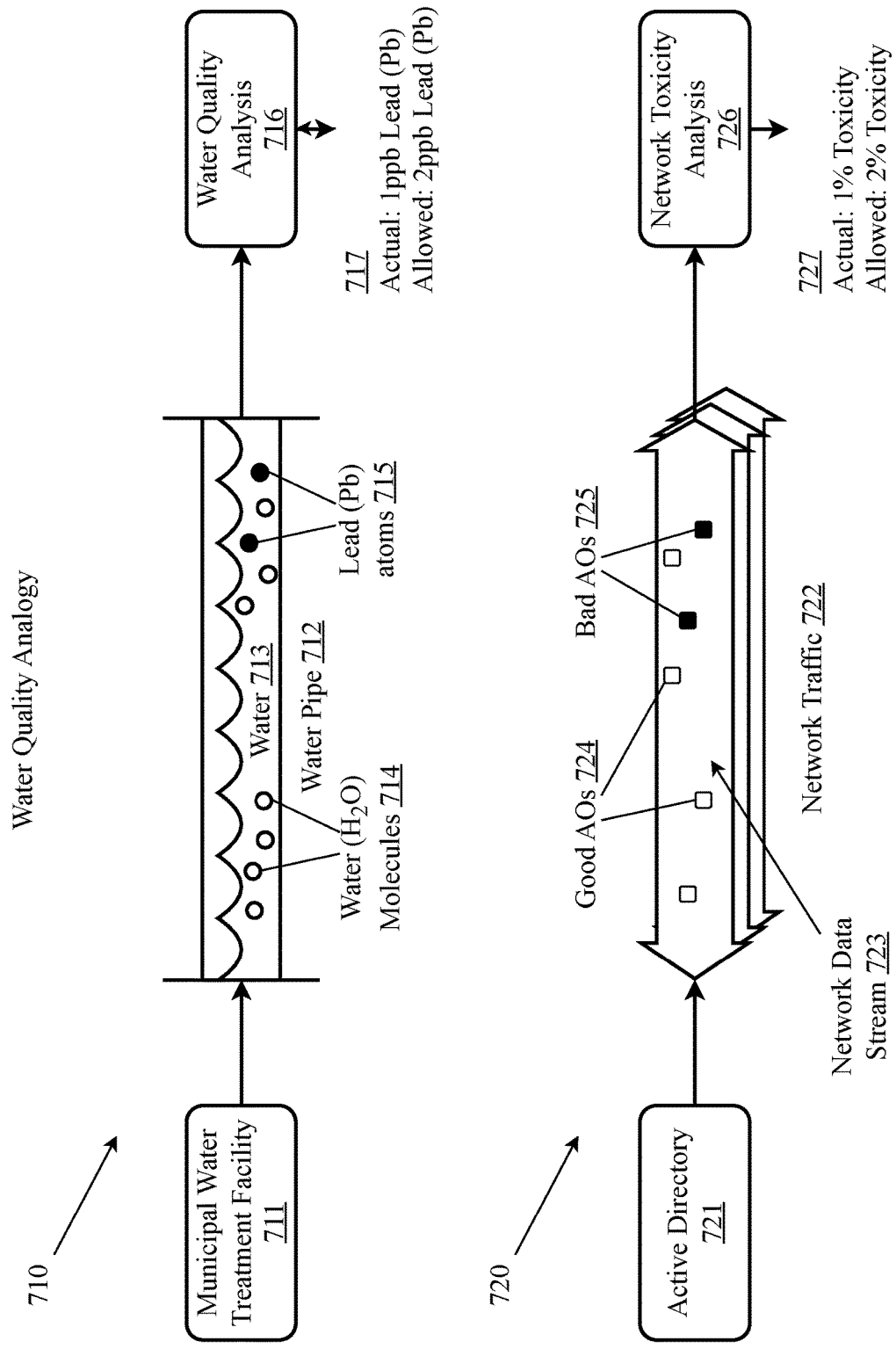
FIG. 7 is a diagram illustrating an analogy between host-level ticket forgery detection using global authentication record validation and water quality.

FIG. 7 is a diagram illustrating an analogy between host-level ticket forgery detection using global authentication record validation and water quality. One of the chief limitations of the zero trust network security paradigm is that network security (NS) and information technology (IT) staff need to consider both "good" and "bad" traffic. Detected attacks are tremendously valuable in this regard, but what is missing is the ability to measure the overall health of the authentication flow of a network. NS and IT staff need to know the ratio of good authentication traffic versus bad authentication traffic (which may be further broken down into known bad, potentially bad, and bad-looking but benign). These measures of the overall health of a network can be used to improve security and to assess the value of different security controls across IAM, PAM, PIM, and ITDR functions. As there is no perimeter security in a zero trust network (or if there is, it can't be relied upon completely), the proportions of good versus bad authentication traffic can help NS and IT staff to identify the relationship between authentication issues and broader events. It can help NS and IT staff reprioritize security information and event management (SIEM), incident investigation, or analysis based on links between identified or suspected bad authentication events and other indicators of instability (e.g. other detections or even crashes/crush dumps), authentication instability, or detected manipulation or authentication forgery.

Accordingly, a useful metric in such analysis is network "toxicity," defined as the proportion of "good" authentications in the network versus "bad" or less secure authentications. In other words, a network's toxicity is what proportion of the network's traffic comprises lower-security protocols, or what proportion of users, devices, and transactions already within a network are threats to the network's security.

Network "toxicity" can be analogized to a water quality report for municipal water systems which identifies the level of toxic substances in drinking water. For example, shown at 710 is the water quality portion of the analogy. A municipal water system 711 treats and provides water in accordance with drinking water regulations. Drinking water regulations are legally enforceable primary standards and treatment techniques that apply to municipal water systems. Primary standards and treatment techniques protect public health by limiting the levels of contaminants in drinking water. But having water quality standards does not ensure 100% pure water in a municipal system. In fact, contaminants are allowed to be in drinking water in limited quantities as long as the amount stays under a defined limit that has been determined to be safe for human consumption. For example, in the U.S., the chemical element mercury is highly toxic to humans, but is allowed to exist in drinking water up to 0.002 mg/L or 2 ppb. While it would be ideal not to have any toxic substances at all in municipal water systems, a perfect absence of them is impossible in any real-world water system. Therefore, acceptable limits of such contaminants have been established as a balance between health and practicality. Thus, the water 713 contained in any given water pipe 712 or other portion of the water system will have some high proportion of pure water (i.e., water molecules) 714 and some small proportion of contaminants such as lead (chemical symbol Pb) 715. A water quality report 716 is produced on a regular basis showing the levels of contaminants 717 in this case a lead (Pb) toxicity of 1 part per billion (ppb) actual versus 2 parts per billion (ppb) allowed (meaning that the water meets the standard even though it has some small level of the contaminant). The known levels of contaminants allow the municipal water system to make adjustments to its water treatment systems and procedures.

The levels of contaminants allowed may be different for small-scale systems (e.g., single family wells) versus large-scale systems (e.g., major municipal water systems) as they have different materials, lengths of pipe, storage capacities, and treatment methods. As a perfect absence of toxic substances is impossible or highly impractical, a balance must be struck between ensuring that water is generally safe for use within the reasonable operational constraints and associated degree of economic/life exposed to its underlying operating assumptions. However, that balance cannot be struck unless the level of contaminants (i.e., the level of toxicity) in the water is known.

The situation is similar for zero trust network security. In manner analogous to the public's reliance on the municipal water authority for provision of clean water, NS and IT professionals rely on standard Identity Providers (IdPs) 721 to ensure that traffic within the network is clean (i.e., that only the users that are authenticated and authorized have access to data). NS and IT professionals trust that traffic is clean because it is authenticated by a trusted source. Single Sign-on (SSO) in computer networks is loosely analogous to opening a faucet on a municipal water system. We trust the water that comes out of the faucet because we trust the water source in the same way that network services trust SSO tickets and tokens presented because they come from a trusted IdP. In both cases, we have previously established trust, but in both cases do not verify quality for every ounce of water or data transaction. When we request data or resources from a Service Provider (SP), whether it's an on premise file share or cloud service, it allows us access because we provide proof from an Identity Provider, a previously trusted source, that we're allowed to do so.

Similarly to having acceptable levels of contaminants in drinking water, there is some percentage of authentications in network traffic 722 that may also be "contaminated" in one way or another. As with water in municipal water systems, there will be a high proportion of "good" authentications in the network data streams 723, and a low proportion of "bad" authentication objects 725 in the network data streams 723. Current network security protocols have no way of measuring what portion of authentication traffic is "bad" such as authentications using weak protocols like NTLM, use of weak encryption like Rivest Cipher 4 (RC4), or even outright authentication forgeries like Golden Tickets or Golden SAML. This is true of any given IdP but even more striking when considering the common federation of Microsoft's® Active Directory and various IdP and SP infrastructure in modem enterprises. Without knowing the proportion of "good" versus "bad" authentications, it is not possible to determine what level of network "toxicity" is operationally acceptable to ensure that a network (or a process within a network) is generally safe and within the enterprise risk tolerance given the range of potential attack and disruption paths, For forgeries of Kerberos or SAML in modern systems the acceptable level may be approaching zero in much the same way that zero is the only acceptable level of lead in drinking water. However, for NTLM most enterprises have some level or risk tolerance for its use on the network as much as they would like to be rid of it. Regardless of what the imposed limit for network "contaminants" should be, the first step is measuring and monitoring the authentication contaminants in real-time with periodic snapshots/indexing of such data to support appropriate reporting and analysis. A network toxicity analysis 726 such as that described herein below would produce the necessary information 727 about network toxicity, for example, that the network has 1% actual toxicity versus 2% allowable toxicity. The levels of allowable toxicity will depend on a number of factors such as the type of computer network, the sensitivity of information on the computer network, the types of computing devices involved, other security measures that may be in place, and other factors.

Figure 8:
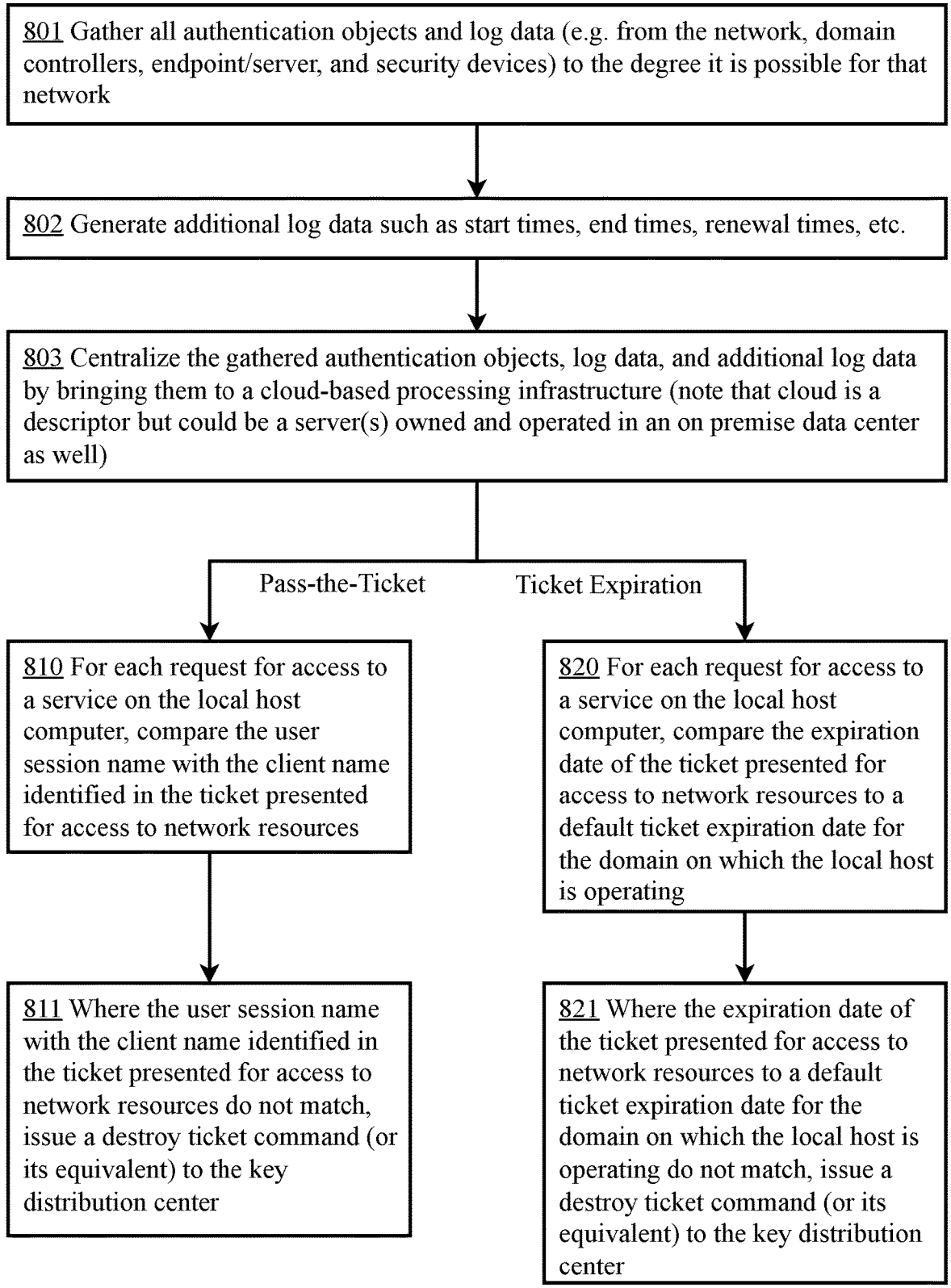
FIG. 8 is a flow diagram illustrating an exemplary method for performing host-level ticket forgery detection using global authentication record validation.

FIG. 8 is a flow diagram illustrating an exemplary method for performing host-level ticket forgery detection using global authentication record validation. At step 801, all authentication objects and log data are gathered from the computer network (e.g. from the network, endpoint/server, and security devices) to the degree it is possible. The amount and quality of gathered objects may vary by organization or network. At step 802, additional log data is created such as start times, end times, renewal times, etc. At step 803, the gathered authentication objects, log data, and additional log data are centralized by bringing them to a cloud-based processing infrastructure. Note that while this embodiment uses a cloud-based processing infrastructure, other configurations are possible, including fully on-premise solutions (such as an a central office location having its own server network), and hybrid solutions wherein certain components are located on-premise and others are cloud-based.

At step 810, for each request for access to a service on the local host computer, the user session name is compared with the client name identified in the ticket presented for access to network resources. At step 811, where the user session name with the client name identified in the ticket presented for access to network resources do not match, a destroy ticket command (or its equivalent) is issued to the key distribution center.

Figure 9:
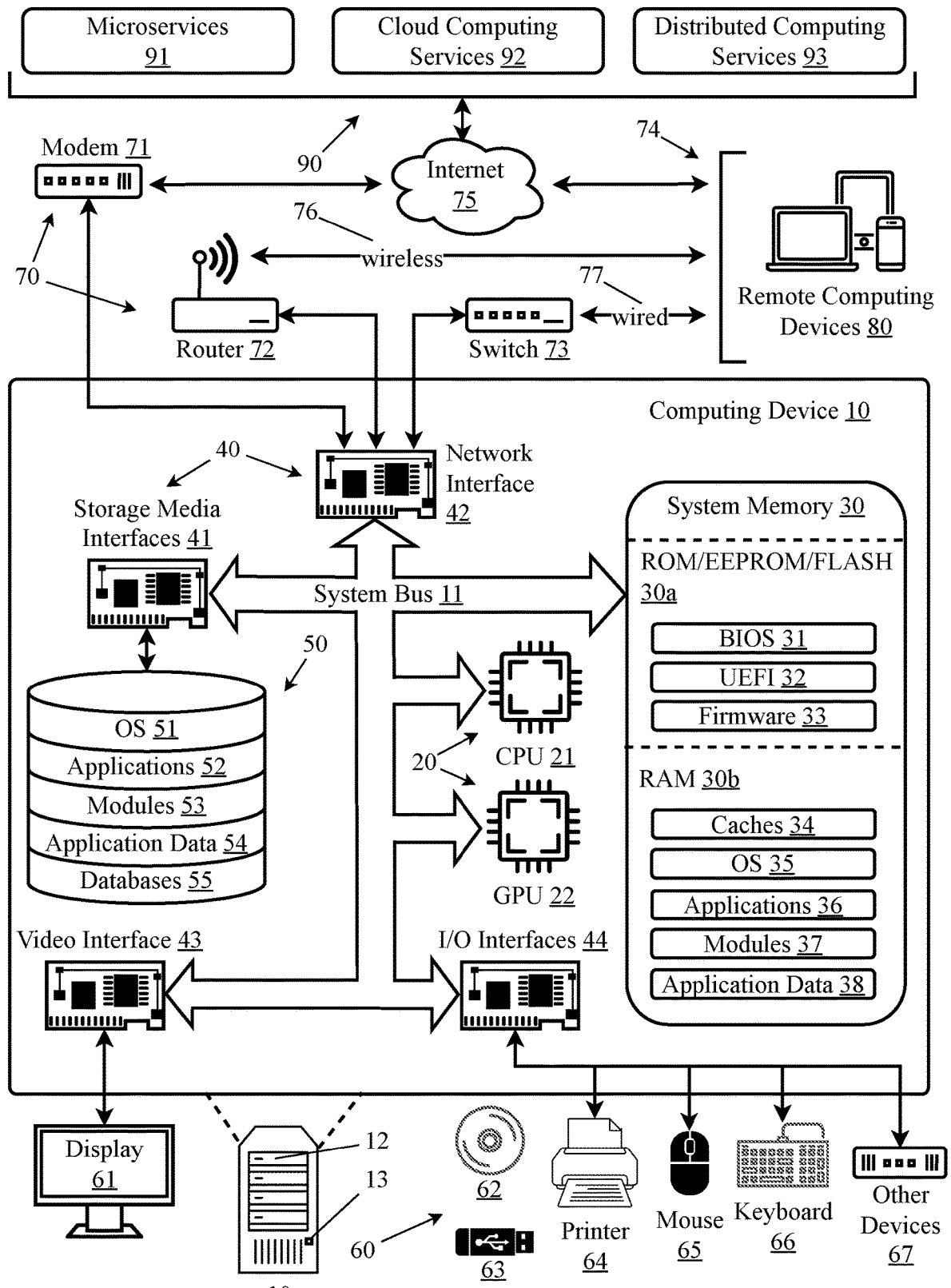
FIG. 9 illustrates an exemplary computing environment on which an embodiment described herein may be implemented.

At step 820, for each request for access to a service on the local host computer, the expiration date of the ticket presented for access to network resources is compared to a default ticket expiration date for the domain on which the local host is operating. At step 821, where the expiration date of the ticket presented for access to network resources to a default ticket expiration date for the domain on which the local host is operating do not match, a destroy ticket command (or its equivalent) is issued to the key distribution center Exemplary Computing Environment FIG. 9 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between, those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions. Further, computing device 10 may comprise one or more specialized processors such as a graphics processing unit (GPU) 22 configured to accelerate processing of computer graphics and images via a large array of specialized processing cores arranged in parallel.

System memory 30 is processor-accessible data storage in the form of volatile and/or nonvolatile memory. System memory 30 may be either or both of two types: non-volatile memory and volatile memory. Non-volatile memory 30a is not erased when power to the memory is removed, and includes memory types such as read only memory (ROM), electronically-erasable programmable memory (EEPROM), and rewritable solid state memory (commonly known as "flash memory"). Non-volatile memory 30a is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30a may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30b is erased when power to the memory is removed and is typically used for short-term storage of data for processing. Volatile memory 30b includes memory types such as random access memory (RAM), and is normally the primary operating memory into which the operating system 35, applications 36, program modules 37, and application data 38 are loaded for execution by processors 20. Volatile memory 30b is generally faster than non-volatile memory 30a due to its electrical characteristics and is directly accessible to processors 20 for processing of instructions and data storage and retrieval. Volatile memory 30b may comprise one or more smaller cache memories which operate at a higher clock speed and are typically placed on the same IC as the processors to improve performance.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, and graph databases.

Applications (also known as computer software or software applications) are sets of programming instructions designed to perform specific tasks or provide specific functionality on a computer or other computing devices. Applications are typically written in high-level programming languages such as C++, Java, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network. Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices.

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, main frame computers, network nodes, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP or message queues. Microservices 91 can be combined to perform more complex processing tasks.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over the Internet on a subscription basis.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A cybersecurity system for host-level pass-the-ticket forgery detection, comprising:
   a first computing device comprising a memory, a processor, and a non-volatile data storage device;
   an authentication ticket log extension database stored on the non-volatile data storage device, the authentication ticket log extension database comprising additional log data for a ticket-granting-type cybersecurity protocol, the additional log data comprising a start time, an end time, and a renewal time for each ticket issued by the ticket-granting-type cybersecurity protocol;
   a ticket granting security system comprising a first plurality of programming instructions stored in the memory which, when operating on the processor, causes the first computing device to:
      install a ticket granting log extension utility on one or more second computing devices;
      receive the additional log data generated by the ticket granting log extension utility;
      monitor access requests by a client operating on a local host computer for access to resources on a network;
      identify a ticket generated by the ticket-granting-type cybersecurity protocol associated with an attempted access of a network resource, the ticket comprising a client name;
      retrieve a user session name for the attempted access;
      compare the client name with the user session name; and
      where there is a mismatch between the client name and user session name, send a destroy ticket command to a key distribution service using the ticket-granting-type cybersecurity protocol; and
   the ticket granting log extension utility comprising a second plurality of programming instructions operating on the one or more second computing devices which causes each second computing device to:
      enumerate every logon session on the second computing device;
      query a local ticket cache of the second computing device to obtain a log data stream for the logon session;
      generate the additional log data to supplement the log data stream; and
      store the additional log data as part of the log data stream.

2. The cybersecurity system of claim 1, wherein the first computing device is the local host computer, and the ticket granting security system is operating on the local host computer.

3. The cybersecurity system of claim 1, wherein the first computing device is a cloud-based server separate from the local host computer, and the ticket granting security system is operating on the cloud-based server, monitoring access requests by the local host computer.

4. The cybersecurity system of claim 1, wherein the first plurality of programming instructions of the ticket granting security system further cause the first computing device to determine that the ticket is forged by comparing the start time for the ticket from the additional log data to an expected start time, and upon determining that the ticket is forged, sending a destroy ticket command to the key distribution service using the ticket-granting-type cybersecurity protocol.

5. The cybersecurity system of claim 1, wherein the first plurality of programming instructions of the ticket granting security system further cause the first computing device to determine that the ticket is forged by comparing the end time for the ticket from the additional log data to an expected end time, and upon determining that the ticket is forged, sending a destroy ticket command to the key distribution service using the ticket-granting-type cybersecurity protocol.

6. The cybersecurity system of claim 1, wherein the first plurality of programming instructions of the ticket granting security system further cause the first computing device to determine that the ticket is forged by comparing the renewal time for the ticket from the additional log data to an expected renewal time, and upon determining that the ticket is forged, sending a destroy ticket command to the key distribution service using the ticket-granting-type cybersecurity protocol.

7. The cybersecurity system of claim 1, wherein the additional log data is stored in a graph-based information storage service.

8. The cybersecurity system of claim 1, wherein the additional log data further comprises an encryption level for each ticket issued by the ticket-granting-type cybersecurity protocol.

9. The cybersecurity system of claim 8, wherein the first plurality of programming instructions of the ticket granting security system further cause the first computing device to determine that the ticket is forged by comparing the encryption level for the ticket from the additional log data to a current encryption level for the ticket to determine if the encryption level has been downgraded, and upon determining that the encryption level has been downgraded, sending a destroy ticket command to the key distribution service using the ticket-granting-type cybersecurity protocol.

10. A cybersecurity method for host-level pass-the-ticket forgery detection, comprising the steps of:
   storing an authentication ticket log extension database on a non-volatile data storage device of a first computing device comprising a memory, a processor, and the non-volatile data storage device, the authentication ticket log extension database comprising additional log data for a ticket-granting-type cybersecurity protocol, the additional log data comprising a start time, an end time, and a renewal time for each ticket issued by the ticket-granting-type cybersecurity protocol;
   using a ticket granting security system operating on the first computing device to perform the steps of:
      installing a ticket granting log extension utility on one or more second computing devices;
      receiving the additional log data generated by the ticket granting log extension utility;
      monitoring access requests by a client operating on a local host computer for access to resources on a network;
      identifying a ticket generated by the ticket-granting-type cybersecurity protocol associated with an attempted access of a network resource, the ticket comprising a client name;

retrieving a user session name for the attempted access;

comparing the client name with the user session name; and where there is a mismatch between the client name and user session name, sending a destroy ticket command to a key distribution service using the ticket-granting-type cybersecurity protocol; and using the ticket granting log extension utility operating on the one or more second computing devices to perform the following steps for each second computing device:

enumerating every logon session on the second computing device;

querying a local ticket cache of the second computing device to obtain a log data stream for the logon session;

generating the additional log data to supplement the log data stream; and storing the additional log data as part of the log data stream.

11. The cybersecurity method of claim 10, wherein the first computing device is the local host computer, and the ticket granting security system is operating on the local host computer.

12. The cybersecurity method of claim 10, wherein the first computing device is a cloud-based server separate from the local host computer, and the ticket granting security system is operating on the cloud-based server, monitoring access requests by the local host computer.

13. The cybersecurity method of claim 10, wherein the method is further configured to drop or block data packets associated with the ticket after the ticket destroy command has been sent.

14. The cybersecurity method of claim 10, wherein the ticket granting security system further determines that the ticket is forged by comparing the start time for the ticket from the additional log data to an expected start time, and upon determining that the ticket is forged, sending a destroy ticket command to the key distribution service using the ticket-granting-type cybersecurity protocol.

15. The cybersecurity method of claim 10, wherein the ticket granting security system further determines that the ticket is forged by comparing the end time for the ticket from the additional log data to an expected end time, and upon determining that the ticket is forged, sending a destroy ticket command to the key distribution service using the ticket-granting-type cybersecurity protocol.

16. The cybersecurity method of claim 10, wherein the ticket granting security system further determines that the ticket is forged by comparing the renewal time for the ticket from the additional log data to an expected renewal time, and upon determining that the ticket is forged, sending a destroy ticket command to the key distribution service using the ticket-granting-type cybersecurity protocol.

17. The cybersecurity method of claim 10, wherein the additional log data is stored in a graph-based information storage service.

18. The cybersecurity method of claim 10, wherein the additional log data further comprises an encryption level for each ticket issued by the ticket-granting-type cybersecurity protocol.

19. The cybersecurity method of claim 18, wherein the ticket granting security system further determines that the ticket is forged by comparing the encryption level for the ticket from the additional log data to a current encryption level for the ticket to determine if the encryption level has been downgraded, and upon determining that the encryption level has been downgraded, sending a destroy ticket command to the key distribution service using the ticket-granting-type cybersecurity protocol.

20. The cybersecurity method of claim 10, wherein the method is further configured to drop or block data packets associated with the ticket after the ticket destroy command has been sent.

* * * * *